United States Patent [19]
Piazza

[11] Patent Number: 5,738,482
[45] Date of Patent: Apr. 14, 1998

[54] APPARATUS FOR GRIPPING AND TRANSPORTING SLABS OF GREAT DIMENSIONS HAVING FEEDING SUCKERS

[76] Inventor: Antonio Piazza, Via Tuzzi, 87, Schio (Vicenza), Italy

[21] Appl. No.: 595,575

[22] Filed: Feb. 1, 1996

[30] Foreign Application Priority Data

Feb. 3, 1995 [IT] Italy ................... VI95A0018

[51] Int. Cl.⁶ .................................................. B65G 1/04
[52] U.S. Cl. ................................... 414/752; 414/277
[58] Field of Search ........................... 414/281–283, 414/277, 752, 225, 737

[56] References Cited

U.S. PATENT DOCUMENTS

| | | | |
|---|---|---|---|
| 3,750,804 | 8/1973 | Lemelson | 414/283 X |
| 4,735,539 | 4/1988 | Hakkinen et al. | 414/282 X |
| 4,969,791 | 11/1990 | Stolzer | 414/283 X |
| 5,256,022 | 10/1993 | Neudecker | 414/752 X |
| 5,483,876 | 1/1996 | Davis et al. | 414/752 X |
| 5,542,805 | 8/1996 | Lisec | 414/752 X |

FOREIGN PATENT DOCUMENTS 211096  7/1984  Germany ................... 414/752

*Primary Examiner*—David A. Bucci
*Attorney, Agent, or Firm*—Bucknam and Archer

[57] ABSTRACT

The apparatus has a carriage (1) which moves along rails (4) and which is provided with a rod (9) which may have a circular cross-section and which carries the vertical uprights (10). The apparatus also has a rotation group (6) and a translation group (7) along longitudinal axis of the rod (9) and a gripping group of different types of the feeding suckers (11), the latter being integral with the uprights (10) so that the operations of loading and unloading slabs of glass or other material from the storehouses may be carried out.

10 Claims, 2 Drawing Sheets

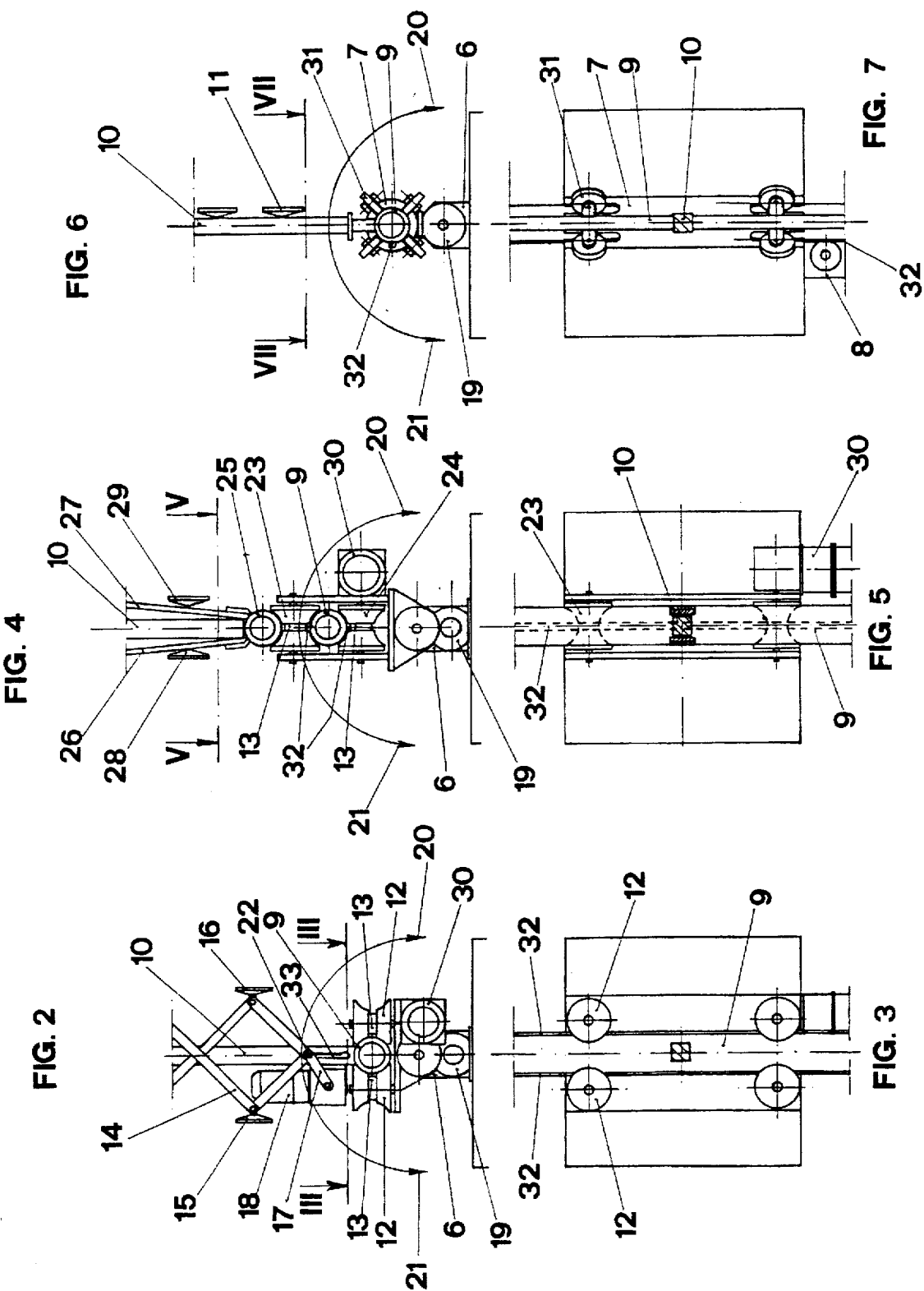

APPARATUS FOR GRIPPING AND TRANSPORTING SLABS OF GREAT DIMENSIONS HAVING FEEDING SUCKERS

FIELD OF THE INVENTION

The present invention relates to apparatuses for gripping and transporting slabs from a storehouse, the slabs carrying a product.

BACKGROUND OF THE INVENTION

Storehouses are known, such as described in patents filed in Italy in the name of the same inventor dated Sep. 18, 1992 under No. VI92A000135 and also No. VI92A000136 also filed Sep. 18, 1992. However the apparatuses for gripping and transporting the slabs according to the above mentioned patents are limited to storehouses of specific types.

SUMMARY OF THE INVENTION

The object of the present invention is to provide an apparatus for gripping and transporting with feeding suckers slabs of great dimensions which are inserted in a storehouse with frames fixed or movable either transversely or longitudinally for products placed on the slabs, the slabs being of a planar shape such as slabs of glass or other material.

The apparatus according to the present invention comprises essentially a carriage which is movable on one or more rails of a particular shape for guiding and translation along a rectilinear or curved path. The motions of the carriage are controlled by a motorized drive group, some guiding means being provided against turn over, the guiding means being particularly designed in view of the great dimensions and weight which the slabs of glass or other material may have, the slabs being removed and transported. A rotation group is disposed on top of the carriage, the rotation group bring motorized or bring provided with a manual control, the rotation group permitting to turn over the slabs which have been removed either on one side or the opposite side, so that these slabs may be placed in a position which may be planar, vertical, or inclined on the transportation means or the transfer systems or directly on the apparatus used for working the product which has been removed.

A translation group is mounted on the rotation group and the device for gripping the slabs slides longitudinally within the translation group.

BRIEF DESCRIPTION OF THE DRAWINGS

The apparatus according to the present invention will be described in more detail hereinbelow by reference to the accompanying drawings according to a few embodiments of the invention by way of a non-limiting example, the example not being limited because the invention may assume other forms and other aspects while the essential characteristics of the invention remain the same without going outside of the scope of the invention.

The drawings are:

FIGS. 2 and 3 show respectively a front view and a top view in cross section of the first embodiment of the invention and particularly of the turnover group and the translation of the complex of the feeding suckers and the first embodiment of the complex of the feeding suckers with a device for widening with a triangular configuration or an articulated quadrilateral configuration.

FIGS. 4 and 5 illustrate a second embodiment of the translation group and a second embodiment of the complex of the feeding suckers with frames having a conical cross-section.

FIGS. 6 and 7 illustrate a third embodiment of the translation group and a third embodiment of the complex of the feeding suckers with a simple upright.

As shown in FIG. 1, the apparatus of the present invention comprises carriage (1) which is movable along wheels (2), the wheels resting along a plane. The carriage is guided by a plurality of rollers (3) which slide along a guiding rail (4) having for instance a cylindrical cross-section, the rail having a rectilinear or curved path according to the requirements of the operation. Obviously, a control group (5) suitably designed, allows a motion of the carriage (1) along the rail (4) in one direction or another direction according to the requirements.

Figure 1:
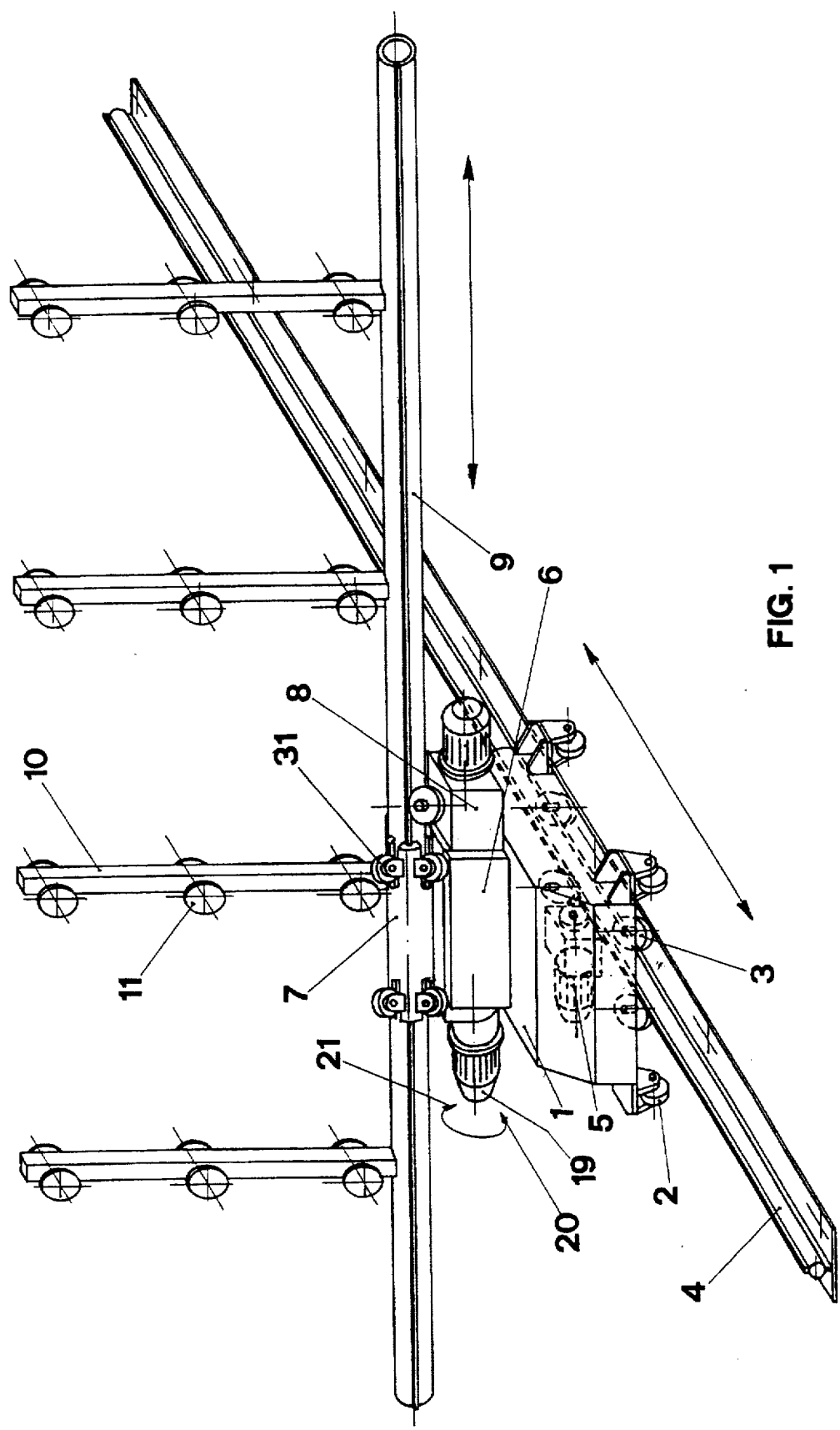
FIG. 1 shows the apparatus of the invention according to a first construction embodiment.

On top of carriage (1) is mounted the rotation group (6) which causes the rotation on one side or on the opposite side of the gripping system according to the curved arrows (20) and (21) by means of motor (19).

On top of the rotation group (6) there is mounted, for instance with a hinge, the guiding group (7). Rod (9) slides in the interior of the guiding group (7), the rod (9) being controlled by the transfer group (8). The latter group (8) supports frames (10) on which are disposed a plurality of feeding suckers (11) which are capable of removing the slabs made of glass or other material contained in the storehouses. Obviously several forms of the rotation group, of the guiding group and also the gripping group may be used. Obviously the interchangeability among these groups may also be provided.

In the embodiment shown in FIGS. 2 and 3, there is shown a plurality of guiding rollers (12) having a vertical axis and carrying in the centerline a ring gear (13). The rollers are caused to rotate by means of suitable transmissions and mechanical rebounds from the control group (30).

In the interior of the guiding rollers (12) slides rod (9) which has a circular cross-section but the cross-section could also be different. Rod (9) carries racks (32) which are integral with the rod and which receive motion from the ring gear (13).

Rod (9) carries uprights (10) on which there is mounted a gripping system of triangular configuration if it is mounted only on one side or with a quadrilateral configuration if it is mounted on two opposite sides (14). In this latter case, the feeding suckers (15 and 16) are mounted on opposite apexes.

The lever (17) placed in motion by the control group (18) is integral in its motion downwardly or upwardly with pin (22) which slides in the interior of a guiding slit (33) formed in the upright so that the gripping complex may widen itself or become narrower transversely to the upright (10) in order to remove the slabs of glass or other material.

According to the embodiment shown in FIGS. 4 and 5, the guiding rollers having a horizontal axis (23) and (24) are placed in rotation by means of suitable transmissions and mechanical rebounds from the control group (30) and are placed in position respectively above and below rod (9) and a second rod (25) parallel to rod (9) is integral with it. In this manner, a frame is constituted carrying an upright (10) on which are fixed structures (26) and (27) which have a conical cross-section and which carry the feeding suckers (28) and (29) so as to remove or deposit the slabs made of glass or other material usually stored in the storehouses with inclined orientation.

In the embodiment shown in FIGS. 6 and 7, there is shown a plurality of wheels or rollers (31) which are disposed in a cross configuration in the guiding group (7). Rod (9) slides in the interior of the guiding group (7), this rod (9) carrying the uprights (10). Rod (9) slides due to the transfer group (8) by means of rack (32) which is integral with rod (9). The remainder of the other features discussed with respect to the other embodiments remain the same.

Obviously as already mentioned hereinabove other possible forms of construction may be used without departing from the main features of this invention.

What is claimed is:

1. An apparatus for gripping slabs of great dimensions, said slabs having a product thereon, said slabs being inserted or removed from a storehouse for the purpose of disposing said slabs on a transportation means for depositing said slabs on a machine for working said product, the apparatus comprising a carriage (1), guiding rails (4), said carriage being movable on said guiding rails, a plurality of rollers (3) on said carriage said rollers sliding on said rails (4), a rotation group (6) mounted on said carriage for turning over said slabs, a guiding group (7) (12) (23) (24) fixed on top of said rotation group, a control system (30) for controlling the motion of said carriage along said rails, said guiding group having an interior, a rod (9) sliding longitudinally in said interior of said guiding group (7), (12) (23) 24), a transfer group, a gripping system including a plurality of feeding suckers (11) (15,16) (28) (29) disposed on uprights attached to said rod, said feeding suckers gripping said slabs for the purpose of inserting or removing said slabs from the storehouse.

2. An apparatus according to claim 1 wherein said guiding rails are straight.

3. The apparatus according to claim 1 wherein said slabs are inserted in an inclined position.

4. The apparatus according to claim 1 wherein said slabs are inserted in a vertical position.

5. The apparatus according to claim 1 wherein said guiding group further includes guiding rollers (12) with a vertical axis, a control system (30) controlling the motion of said guiding rollers, said guiding rollers carrying a ring gear (13) between two said rollers, said rod (9) sliding between said guiding rollers, racks being integral with said rod (9) and being coupled with said ring gear (13), said gripping system including a lever (17), a second control system (18) placing in motion said lever, said lever having pin (22), said pin sliding in an interior of a guiding slit, said guiding slit (33) being formed in an upright (10) whereby an width of said gripping system varies transversely with respect to said upright (10) for the purpose of removing said slabs.

6. The apparatus according to claim 5 wherein said gripping system has a triangular configuration when it is mounted on only one side of said upright.

7. The apparatus according to claim 5 wherein said gripping system has a quadrilateral configuration having four apexes when it is mounted on both sides of said upright and said feeding suckers (15 and 16) are mounted on opposite apexes.

8. The apparatus according to claim 1 wherein said guiding group consists of members (23) and (24), said members (23) and (24) being placed respectively above and below said rod (9) and the apparatus comprises a second rod (25) integral with said first rod (9), said first and second rods (9 and 25) carrying said uprights (10), and the apparatus further comprises structures (26 and 27) having a conical cross-section, said structures being disposed on said uprights (10), said structures carrying said feeding suckers (28 and 29).

9. The apparatus according to claim 1 which comprises a plurality of rollers (31) disposed in said guiding group (7) in a cross configuration, said rod (9) sliding in an interior of said guiding group (7), and the apparatus comprises racks (32), said racks being integral with said rod (9).

10. The apparatus according to claim 9, wherein said rod (9) slides under the action of said transfer group (8) through said racks (32).

* * * * *